United States Patent [19]

Chin et al.

[11] Patent Number: 4,953,144
[45] Date of Patent: Aug. 28, 1990

[54] THIRD-PARTY DETECTION AROUND PIPELINES

[75] Inventors: Robert Wing-Yu Chin; Vitold R. Kruka; Thomas L. Stewart; Robert W. Patterson; Edward R. Cadena, Jr., all of Houston, Tex.

[73] Assignee: Shell Oil Company, Houston, Tex.

[21] Appl. No.: 405,256

[22] Filed: Sep. 11, 1989

[51] Int. Cl.$^5$ ............................................. H04B 1/06
[52] U.S. Cl. .................................. 367/135; 367/191; 181/112; 340/566
[58] Field of Search ............... 181/0.5, 101, 108, 112, 181/122, 401; 367/13, 20.24, 135, 136, 153, 178, 191, 177, 909, 124, 126, 129; 73/432.1; 340/566

[56] References Cited

U.S. PATENT DOCUMENTS

| | | | |
|---|---|---|---|
| 4,075,601 | 2/1978 | Flournoy | 367/13 X |
| 4,083,229 | 4/1978 | Anway | 73/40.5 |
| 4,253,167 | 2/1981 | Flournoy et al. | 367/135 X |
| 4,337,528 | 6/1982 | Clinard et al. | 367/136 |
| 4,590,799 | 5/1986 | Brown et al. | 73/432 R |
| 4,604,738 | 8/1986 | Aggarwal et al. | 367/135 |

Primary Examiner—Brian S. Steinberger

[57] ABSTRACT

Geophones are placed around pipelines to detect third parties, e.g., heavy construction vehicles. Associated computer equipment acquires data from the geophones and discriminates for the frequencies associated with heavy construction vehicles.

4 Claims, 1 Drawing Sheet

THIRD-PARTY DETECTION AROUND PIPELINES

BACKGROUND OF THE INVENTION

The present invention relates to the detection of heavy vehicles around pipelines.

There is the danger of an earth moving vehicle digging into earth surrounding the pipeline and causing a major rupture of the pipeline. Normal prevention procedures call for the vehicle operator to contact pipeline companies to point out locations of their pipelines. However, due to various reasons, this prevention procedure may not be followed. It is important then to detect third parties on an automatic basis. It is, of course, critically important that pipelines not fail in service since the economic consequences and pollution are serious.

Accordingly, the present invention is directed to overcoming these and other problems experienced by the prior art.

SUMMARY OF THE INVENTION

The present invention provides a method and apparatus for detecting heavy vehicles, especially construction vehicles, in the vicinity of a pipeline.

Thus, according to the present invention, there is provided a method and apparatus for determining the presence of a heavy construction vehicle in the vicinity of a pipeline, comprising disposing a geophone at least near the pipeline; detecting background vibration frequencies in the vicinity of the pipeline with the geophone; predetermining the vibration frequencies associated with the heavy vehicles; discriminating between vibration frequencies associated with the heavy vehicles and background vibration frequencies. The invention further includes spacing geophones along a pipeline and determining which geophone is closest to the heavy vehicle by intensity of the vibrations. In addition, the invention includes calculating the relative location of the heavy vehicle between two geophones based on the intensity of vibrations detected by the geophones.

Other purposes, distinctions over the art, advantages and features of the invention will be apparent to one skilled in the art upon review of the following.

BRIEF DESCRIPTION OF THE DRAWINGS

The actual construction, operation, and the apparent advantages of the present invention will be better understood by referring to the drawings in which like numerals identify like parts and in which.

DESCRIPTION OF THE PREFERRED EMBODIMENTS

Figure 1:
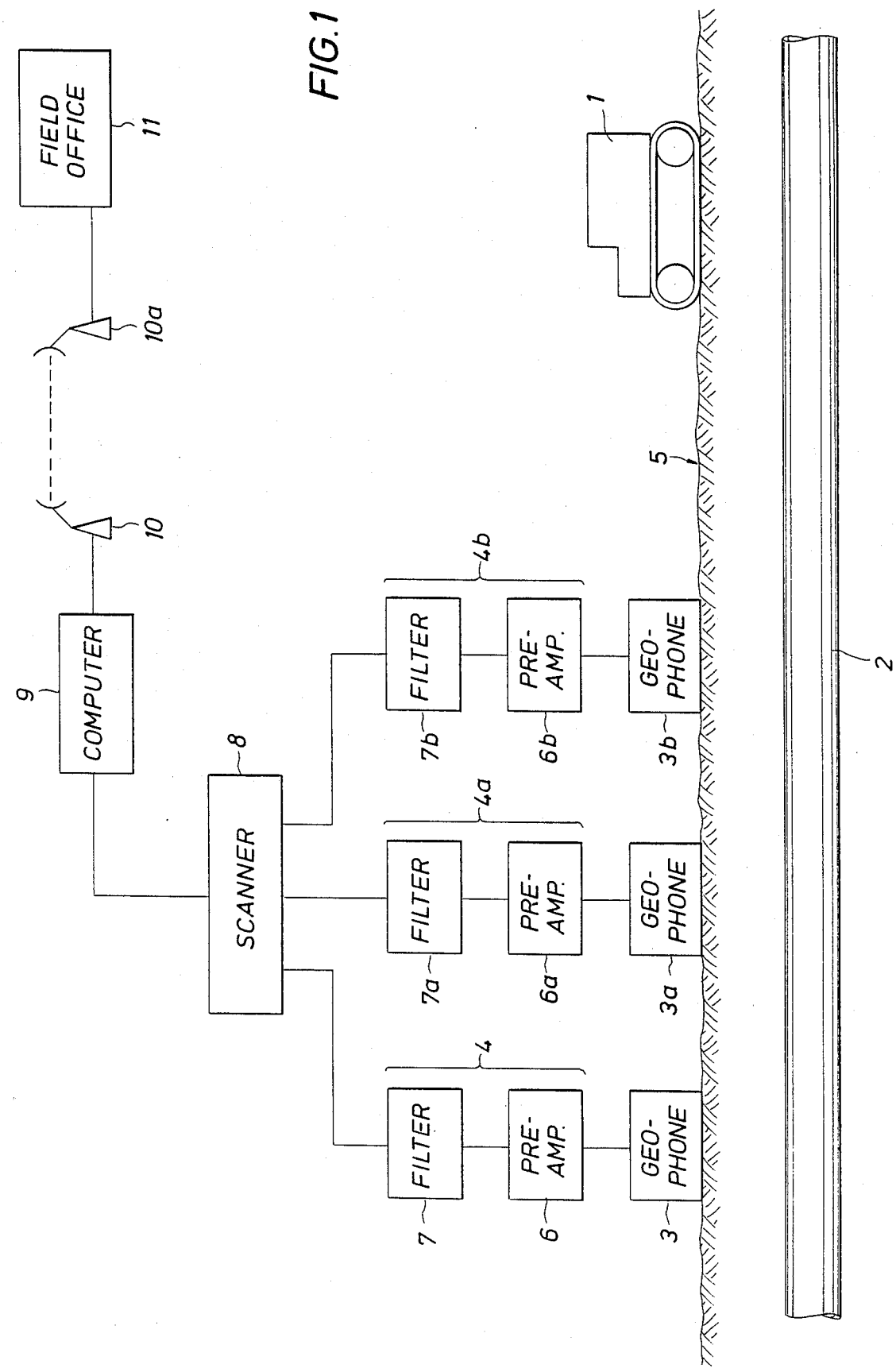
FIG. 1 shows an embodiment of the invention which illustrates schematically suitable equipment for detecting third party vehicles in the vicinity of a pipeline.

A sensor in the form of a geophone 3 is provided which is suitably placed in the soil 5 in the vicinity of the buried pipeline 2. The geophone 3 is electrically connected by means of an extension cable to an amplifier/filter unit 4 as hereinafter described.

Geophone 3 produces an electrical output proportional to the vibration produced by movement of the heavy construction vehicle 1 on the earth. This signal is amplified by a preamplifier 6. The amplifier gain can be selected within a range. The amplified signal can be fed directly to a frequency filter unit 7 where unwanted frequency components in the signal (i.e., background vibration frequencies) are attenuated to enhance the peak value of the heavy vehicle vibration frequencies. This is done by detecting background noise in the vicinity of the pipeline prior to the occurrence wherein a heavy vehicle approaches the pipeline.

From filter 7, the filtered signal is fed to an analog-to-digital (A/D) convertor and scanner unit 8. The A/D part converts the analog signal from the geophone to a digital form that could be easily handled by a computer or a microprocessor-base procesing unit 9. The scanner part of unit 8 is needed if more than one geophone signal is to be processed. The scanner would switch the signal from one geophone to the next for processing by the A/D convertor.

The signals from other geophones 3a and 3b with associated amplifier/filter units 4a and 4b having preamplifiers 6a and 6b and filter units 7a and 7b can also be digitized and conditioned for interfacing with the above computer devices. Such other geophones can be employed in various spacings as desired so that the location of vehicular traffic 1 can be detected in accordance with which geophone is most intensely affected. Thus, it is feasible to calculate the relative location of the heavy construction vehicle between the two geophones based on the intensity of vibrations detected by each of the geophones. Since the distance between the geophones is known, the relative distances between the construction vehicle and the geophones can be ratioed in accordance with the intensity of the signals received by each of the two geophones.

The computer unit 9 would then determine whether a vehicle is within a user defineable distance of the pipeline. Additional geophones, placed along the pipeline, would be used to triangulate the vehicle's position. If a vehicle was detected, then an alarm or message would be transmitted by microwave unit 10, 10a to the field office 11. The transmission could also be accomplished by telephone or direct wire. The mode of transmission would depend on location of the field office with respect to the detection system. During non-detection times, the computer could possibly transmit a status message to inform the operator that the system was working.

Present frequencies can be selected in the filter unit 7 to allow the system to be tuned to various differing peak frequencies which vary with other background noise in the vicinity of the pipeline, e.g., minor vehicular traffic, etc.

Filter 7 allows one of a number of preset center frequencies (constant percentage band width) to be selected between 1 Hz and 200 Hz allowing selection of a center frequency which will optimize the detection of heavy vehicular traffic.

The peak signal received by the geophone is mainly dependent upon the natural frequency of oscillation of the earth to which the geophone is connected. The geophone is excited by a broad band of background noise, both ground borne and airborne, as well as the vibration of heavy vehicular traffic. Since the basic signal from the geophone is amplified, the filter unit provides a means for minimizing the intrusion of unwanted background noise.

Accordingly, the present invention provides a convenient method for preventing heavy construction vehicular traffic from damaging a pipeline. If this detector is utilized as part of a routine inspection procedure, potential damage can be detectd and located before it becomes actual, and before any significant pollution damage has been caused.

The foregoing description of the invention is merely intended to be explanatory thereof, and various changes in the details of the described method and apparatus may be made within the scope of the appended claims without departing from the spirit of the invention.

What is claimed is:

1. A method for determining the presence of a heavy vehicle in the vicinity of a pipeline, comprising:
    spacing geophones along the pipeline;
    detecting background vibration frequencies in the vicinity of said pipeline with said geophones;
    predetermining the vibration frequencies associated with said heavy vehicle;
    discriminating between vibration frequencies associated with said heavy vehicle and background vibration frequencies; and
    determining which geophone is closest to the heavy construction vehicles by the intensity of the vibration.

2. The method of claim 1 including calculating the relative location of said heavy construction vehicle between two geophones based on the intensity of vibrations detected by the geophones.

3. An apparatus for determining the presence of a heavy construction vehicle in the vicinity of a pipeline, comprising:
    means for spacing geophones along the pipeline;
    means for detecting background vibration frequencies in the vicinity of said pipeline with said geophones;
    means for predetermining the vibration frequencies associated with said heavy vehicle;
    means for discriminating between vibration frequencies associated with said heavy vehicle and background vibration frequencies; and
    means for determining which geophone is closest to the heavy construction vehicle by the intensity of the vibrations.

4. The apparatus of claim 3 including means for calculating the relative location of said heavy construction vehicle between two geophones based on the intensity of vibrations detected by the geophones.

* * * * *